US009788231B2

(12) United States Patent
Ferrarotti et al.

(10) Patent No.: US 9,788,231 B2
(45) Date of Patent: Oct. 10, 2017

(54) METHOD AND TELECOMMUNICATION SYSTEM FOR PROVIDING NEAR REAL-TIME IP STREAMING SERVICES TO A MOBILE TERMINAL (71) Applicant: TES TELEINFORMATICA E SISTEMI S.r.l., Rome (IT)

(72) Inventors: Alfredo Ferrarotti, Rome (IT); Raimondo Lo Forti, Rome (IT); Giancarlo Bellaveglia, Rome (IT)

(73) Assignee: TeS Teleinformatica e Sistemi S.r.l., Rome (IT)

( * ) Notice: Subject to any disclaimer, the term of this patent is extended or adjusted under 35 U.S.C. 154(b) by 125 days.

(21) Appl. No.: 14/503,624

(22) Filed: Oct. 1, 2014

(65) Prior Publication Data
US 2015/0092657 A1  Apr. 2, 2015

(30) Foreign Application Priority Data
Oct. 2, 2013 (EP) ..................... 13425133

(51) Int. Cl.
*H04L 1/16* (2006.01)
*H04L 1/18* (2006.01)
*H04L 12/925* (2013.01)
*H04W 28/02* (2009.01)
*H04L 29/08* (2006.01)
*H04W 4/02* (2009.01)

(52) U.S. Cl.
CPC ....... *H04W 28/0236* (2013.01); *H04L 1/1671* (2013.01); *H04L 1/1825* (2013.01); *H04L 1/1893* (2013.01); *H04L 47/722* (2013.01); *H04L 67/12* (2013.01); *H04W 4/027* (2013.01)

(58) Field of Classification Search
CPC ... G01S 17/936; H04L 1/0068; H04L 1/1812; H04L 1/1664; H04L 1/0083; H04L 1/0073; H04L 1/1803; H04B 1/707; H04W 84/04
See application file for complete search history.

(56) References Cited

U.S. PATENT DOCUMENTS

| 2003/0137963 | A1* | 7/2003 | Suenaga | H04B 7/18526 370/342 |
| 2005/0128133 | A1* | 6/2005 | Samukawa | G01S 17/936 342/70 |
| 2007/0287410 | A1* | 12/2007 | Bae | H04L 12/66 455/404.2 |
| 2008/0268838 | A1* | 10/2008 | Zufall | H04B 7/18536 455/430 |
| 2010/0142435 | A1 | 6/2010 | Kim et al. | |

FOREIGN PATENT DOCUMENTS

EP        0 936 766 A1    8/1999

* cited by examiner

*Primary Examiner* — Redentor Pasia
*Assistant Examiner* — Peter Mak
(74) *Attorney, Agent, or Firm* — Blank Rome LLP (57) ABSTRACT A method and system for providing near real-time IP streaming services to a plurality of mobile terminals, each installed on a corresponding vehicle and each comprising a delay buffer. Interruptions due to artificial or natural obstacles are such to determine missing data in the delay buffer. The method and system address the management by the service control center of the transmission of the buffers refilling data to the mobile terminals with the aim of reducing the allocation of resources and service operational costs.

13 Claims, 3 Drawing Sheets

METHOD AND TELECOMMUNICATION SYSTEM FOR PROVIDING NEAR REAL-TIME IP STREAMING SERVICES TO A MOBILE TERMINAL

BACKGROUND OF THE INVENTION

1. Field of the Invention

The present disclosure relates to the field of broadband satellite communications, in particular to a method and telecommunication system for providing near real-time IP streaming services to a mobile terminal.

2. Description of the Related Art

IP services delivered to vehicles, such as trains, through satellite networks are affected by relevant interruptions due to obstacles along the track (e.g., tunnels, hills, urban canyon, etc.). In case of near real-time streaming services over IP networks, such as IP Television, these interruptions are not acceptable for the end users.

One of the most effective solutions to the above indicated problem is to deliver such kind of services delaying them by a suitable amount of time (typically 5÷15 minutes) by means of a delay buffer managed by the onboard media server and ensure the continuity of the service by refilling this buffer after each interruption.

However the refilling of the buffers of a fleet of vehicles may sensibly increase the use of the satellite resources, such as the bandwidth, required for providing the near-real time streaming service thus increasing the overall cost of the service.

SUMMARY OF THE INVENTION

In view of the above described problems of the known solutions, it is an object of the present disclosure to provide improved solutions for reducing the operational costs of delivering near real-time IP streaming services which are robust with respect to the consequences of link interruptions due to natural or artificial obstacles that can be found along the tracks run by vehicles.

BRIEF DESCRIPTION OF THE DRAWINGS

Further features and advantages of the new solution will become more apparent from the following detailed description of exemplary but non-limiting embodiments thereof, as illustrated in the attached figures, in which.

DETAILED DESCRIPTION

In the attached figures identical or similar elements will be indicated with the same reference numbers/symbols.

Figure 1:
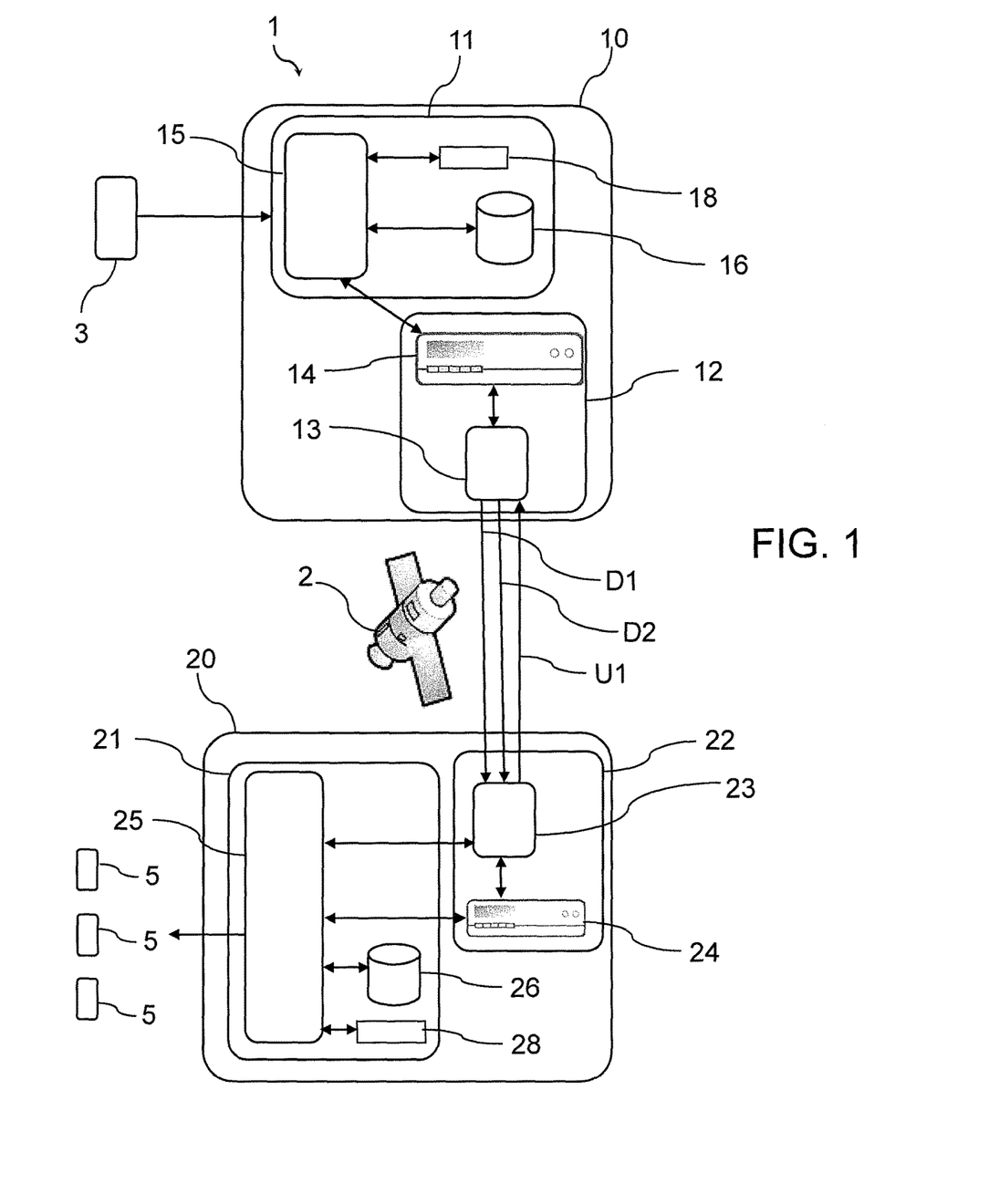
FIG. 1 shows a schematic block diagram of an embodiment of telecommunication system comprising a service control center, a satellite, a mobile terminal.

FIG. 1 shows a very schematic view a telecommunication system 1 comprising a service control center 10, at least one mobile terminal 20, at least one satellite 2.

The mobile terminal 20 is installed on a vehicle, for example a train or a bus. The vehicle preferably belongs to a fleet of vehicles each including a mobile terminal 20 that is adapted to be operatively connected through one or more satellites 2 to the service control center 10 for delivering on board near real-time IP streaming services to the passengers (i.e. the end users) of the vehicles, such as for example near real-time IP television services. The IP streaming services are provided by the mobile terminal 20 to at least one user device 5. From the above it is clear that the service control center 10 manages a plurality of mobile terminals each installed on a corresponding vehicle of the fleet. In other words, it is possible to state that the service control center 10 manages the delivery of IP streaming services for a fleet of vehicles.

In the context of the present description "near-real time" means that an IP streaming service is delivered to the end users with a delay of a certain amount of time, for example comprised in the range of minutes or few (for example one to three) tens of minutes, with respect the real-time transmission of the same service by a content provider 3, such as for example a television broadcaster. The service control center 10 comprises a central server 11 and a satellite terminal 12 adapted to bidirectionally connect the central server 11 to the mobile terminal 20 through the satellite 2.

The satellite terminal 12 comprises a front end section 13 (for example comprising an antenna, UP/DOWN-conversion blocks and interconnection cables between the antenna and said blocks) and a satellite router 14 adapted to connect the central server 11 to the front end terminal 13. According to an embodiment the satellite terminal 12 is part of a satellite operator HUB.

The central server 11 comprises a control unit 15, at least one reference buffer 18 and preferably a geographical database 16 comprising geographical information about the tracks that can be run by the vehicles of the fleet including information about the presence and features (for example the length) of obstacles located along the tracks. Said obstacles can be artificial obstacles (galleries, tunnels, urban canyon, etc.) or natural obstacles (for example hills, peaks of mountains, etc.). The provision of the above database is preferred but not strictly essential, since the information stored may be provided to the service control center by the vehicles of the fleet themselves.

The service control center 10 is adapted to:

receive at least one data stream from a content provider 3 and store, preferably together with control information, a continuously updated portion of said data stream in the reference buffer 18, for example a FIFO reference buffer;

continuously transmit to the mobile terminal 20 the received data stream, preferably together with said control information, through at least a first satellite logical or physical channel D1.

Preferably said control information received by the service control center 10 is such to univocally identify data blocks of the portion of the data stream stored in the reference buffer 18. The addition of the control information at the service control center 10 may not be strictly needed since the data stream received by the content provider 3 may already include control information for univocally identifying the data blocks. The control information is preferably included at Session Level layer (namely at OSI layer 5, for example in the case of an RTP protocol) or at Application Layer level (namely at OSI layer 7, for example in the cases of MPEG and MPEG-TS protocols).

The mobile terminal 20 comprises an on board server 21 and a satellite terminal 22 adapted to bidirectionally connect the on board server 21 to the service control center 10 through the satellite 2.

The satellite terminal 22 of the mobile terminal 20 comprises a front end section 23 (for example comprising a steerable satellite antenna, up/down-conversion blocks and interconnection cables between the steerable antenna and said blocks) and a satellite router 24 adapted to connect the on board server 21 to the front end section 23.

The on board server 21 comprises a control unit 25, a delay buffer 28 and preferably a database 26 comprising geographical information about the tracks that can be run by the vehicle on which the mobile terminal 20 is installed, including information about the presence and features (for example the length) of obstacles located along the tracks. Said obstacles can be artificial obstacles (galleries, tunnels, urban canyon, etc.) or natural obstacles (for example hills, peaks of mountains, etc.).

According to an embodiment, the on board server 21 and in particular the control unit 25 is such to receive as input motion data of the vehicle on which the mobile terminal 20 is installed, for example data adapted to identify the current position of the vehicle. Preferably, said motion data also include velocity data, i.e. data related to the velocity of the vehicle. According to an embodiment, said motion data are preferably provided to the on board server 21 by the steerable satellite antenna comprised in the front end section 23, since said antenna may include a satellite positioning terminal, such as for example a GPS terminal or a GALILEO terminal.

According to an embodiment, the motion data may also include attitude data of the vehicle on which the mobile terminal 20 is installed, i.e. data related to the yaw, pitch and roll of the vehicle.

The on board server 21 is adapted to:

receive at least one data stream, preferably comprising the control information, from the service control center 10 and to store a continuously updated portion of it in the delay buffer 28, which is for example a FIFO buffer, for delaying said data stream;

deliver a streaming service to at least one user terminal 5 based on said delayed data stream.

The on board server 21, for example the onboard control unit 25, is adapted, and in particular configured, for detecting missing data in the portion of data stream stored in the delay buffer 28, for example one of more data blocks missing from the stored portion of data stream due to an interruption of the first logical or physical satellite channel D1. Such interruption is for example caused by the crossing of an obstacle by the vehicle on which the mobile terminal 20 is installed.

Moreover, the mobile terminal 20, for example the onboard control unit 25, is adapted, and in particular configured, for sending to the service control center 10 a retransmission request of said missing data. The retransmission request is transmitted by the front end terminal 22 through a second satellite logical or physical channel U1. Preferably said retransmission request comprises information about motion data of the vehicle, such as for example current position and/or velocity. According to an embodiment the retransmission request includes also data about the operational status of the mobile terminal 20 and of the satellite communication link.

Upon receipt of said retransmission request, the service control center 10 is adapted, and in particular configured, for transmitting to the mobile terminal 20 through at least a third satellite logical or physical channel D2 refilling data comprising said missing data. Said refilling data are taken by the service control center 10 from the reference buffer 18. The mobile terminal 20, and in particular the on board server 21 is adapted, and in particular configured, for refilling the delay buffer with the received refilling data in order to prevent interruptions in the delivery of the IP streaming service to the end users.

The service control center 10 and in particular the central server 11, is such to manage over time the transmission of the refilling data to the mobile terminal 20 based on an information correlated to the distance between the vehicle and a forthcoming obstacle along a track run by said vehicle. Thanks to this feature the service control center may optimize the processing and bandwidth resources needed for the management of the IP streaming service for a plurality of vehicles, namely for the fleet of vehicles. For example, the service control center 10 is adapted to transmit a bigger amount of data packets in a given time period to a first mobile terminal 20 with respect to a second mobile terminal 20, because according to the above distance-correlated information the service control center 10 is adapted to detect that, for example due to a forthcoming obstacle along the track run by the vehicle on which the mobile terminal 20 is installed, there is less time available for refilling the delay buffer 28 of the first mobile terminal 20 than the time available for refilling the delay buffer 28 of the second mobile terminal 20. In other words, based on distance-correlated information the service control center 10 is adapted to selectively schedule the priority and/or the delay buffer refilling rate during the transmission of the refilling data for the different terminal units 20 of the managed fleet of vehicles. Said selective scheduling may also depend on information about the length of obstacles, or in general any morphological or geographical information about the obstacles, stored locally in the geographical database 16 of the service control center 10 and/or in the geographical database 26 of the mobile terminal 20.

For the above purpose different scenarios are possible. According to a first embodiment, the mobile terminal 20 may directly provide the above information correlated to the distance between the vehicle and the forthcoming obstacle, for example obtained by the mobile terminal 20 from the motion data and the information stored in the geographical database 26. According to a second embodiment, the mobile terminal 20 may only provide in the retransmission request motion data (for example, actual position and/or velocity) and the above distance correlated information may be obtained by the service control center 10 from the received motion data and the information stored in the geographical database 16 of the service control center 10.

According to an embodiment in which:

at least the mobile terminal 20 comprises the geographical database 26 storing a map of tracks that can be run by the vehicle;

the antenna included in the front end 23 of the mobile terminal 20 is a steerable satellite antenna;

it is possible to store into the geographical database 26 apart from information about obstacles along said tracks also antenna pre-pointing information, that is to say information about corresponding expected pointing directions of the steerable satellite antenna at the end or exit of said obstacles (or in general at the end of any shadowing event) or pre-pointing information useful for computing said expected pointing directions. Said computing is for example performed by the control unit 25 and/or by the steerable satellite antenna.

In the above case the mobile terminal 20 may be adapted to detect an interruption of the first satellite logical or physical channel D1 (i.e. a shadowing event) due to one of said obstacles and to pre-point said antenna after said detection, for example as soon as possible after said detection, in such a way as to make it point along the expected pointing direction associated to said one obstacle, in order to try to re-establish as soon as possible at the end of said obstacle said first satellite logical or physical channel D1. In other words, consequently to the detection of an interruption of the first satellite logical or physical channel D1 the steerable antenna is pre-pointed along the stored or calculated expected pointing direction.

As it will be better explained in the following, the mobile terminal 20 at the exit or end of an obstacle may be adapted to correct, if required, the steerable antenna pointing direction with respect to the expected direction at which the antenna is pre-pointed after the detection of an interruption of the first satellite logical or physical channel D1. p The information related to the corrections required at the exit or end of a same obstacle can be advantageously collected and used statistically over time in order to continuously refine the pre-pointing information stored into the geographical database 26.

In the above described pre-pointing and/or correction the mobile terminal 20, further to the stored pre-pointing information, may conveniently take into account also motion and attitude information of the vehicle during the crossing the obstacle and/or at the end or exit of the obstacle.

Figure 2:
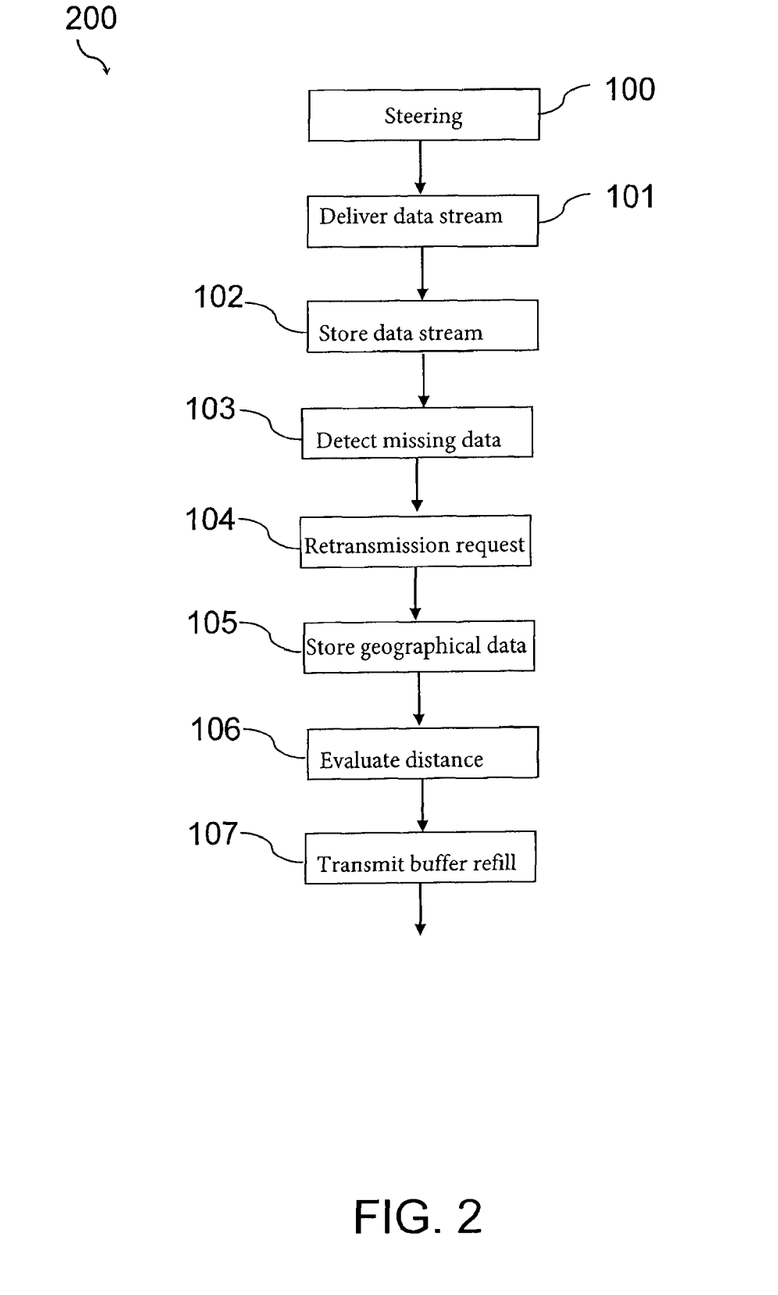
FIG. 2 shows a schematic flow diagram of a method for providing near real-time IP streaming services to a plurality of mobile terminals.

With reference to FIG. 2 the above description of the telecommunication system 1 corresponds to the description of a method 200 for providing near real-time IP streaming services to a plurality of mobile terminals 20, each installed on a corresponding vehicle and each comprising a delay buffer 28.

The method 200 comprises for each mobile terminal 20 the steps of:

delivering 101 by a service control center 10 a main data stream to the mobile terminal 20 through at least a first satellite logical or physical channel D1;

continuously 102 storing a portion of said main data stream into the delay buffer 28;

detecting 103 at the mobile terminal 20 missing data in the portion of the data stream stored in the delay buffer 28;

sending a retransmission request 104 of said missing data to the service control center 10, through at least a second satellite logical or physical channel U1;

transmitting 107 to the mobile terminal 20 buffer refilling data comprising said missing data, through at least a third satellite logical or physical channel D2.

In the transmitting step 107, the transmission of said missing data is managed over time by the service control center 10 based on information correlated to the distance between the vehicle and a forthcoming obstacle along a track run by said vehicle.

According to an embodiment, the step 104 of sending a retransmission request includes sending information correlated to the position and/or velocity of said vehicle.

According to an embodiment the step of delivering 101 by the service control center 10 the main data stream to the mobile terminal 20 is performed according to a multicast protocol. In this way it is possible to advantageously share channel bandwidth resources among a plurality of mobile terminals 20.

According to an embodiment, the step of transmitting 107 to the mobile terminal 20 buffer refilling data, is performed according to a multicast protocol. According to an alternative embodiment said transmission step 105 is performed according to an unicast protocol.

According to an embodiment the method 200 further comprises the steps of:

storing 105 a geographical database 16, 26 comprising information about the position of obstacles along tracks that can be run by said vehicle;

evaluating a distance 106 between the vehicle and the position of forthcoming obstacle along the track.

In the above embodiment, in the transmitting step 107, the transmission of the missing data is managed over time by the service control center 10 based on said evaluated distance. According to a more preferred embodiment, the geographical database 16,26 includes information about the lengths of the obstacles and the transmission of the requested missing data is managed over time by the service control center 10 based on also on the length of said forthcoming obstacle.

According to an embodiment, the step of storing 105 the geographical database 16, 26 is performed at the service control center 10.

According to an embodiment, the mobile terminal 20 comprises a steerable satellite antenna, and an on board server 21 connected to said steerable satellite antenna and a geographical database 26 connected to the on board server 21, wherein the method 200 further comprises a step of steering 100 the steerable antenna.

Figure 3:
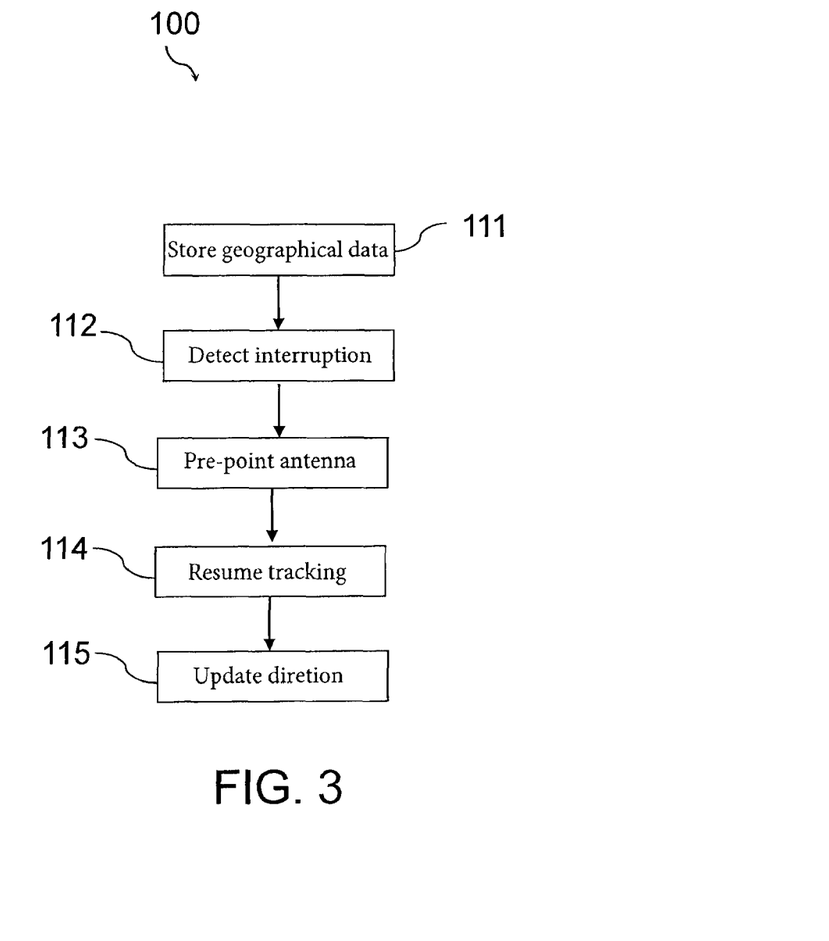
FIG. 3 shows a schematic flow diagram of a sequence of steps that can be performed in addition to the steps of the method of FIG. 2 in order to point a steerable antenna of a mobile terminal.

With reference to FIG. 3 the step of steering 100 the antenna comprises the sub-steps of:

storing ill into the geographical database 26 information about obstacles along said tracks and antenna pre-pointing information, the latter being information about corresponding expected pointing directions of the steerable satellite antenna at the end or exit of said obstacles or information useful for computing said expected pointing directions;

detecting 112 an interruption of said first satellite logical or physical channel D1 due to one of said obstacles;

pre-pointing 113 said antenna after said detecting sub-step 112 in such a way as to make it point along the expected pointing direction associated to said obstacle in order to try to re-acquire as soon as possible at the end of said obstacle said first satellite logical or physical channel D1.

The above described pre-pointing sub-step 113 may therefore determine an interruption of the normal closed loop tracking of the satellite by the steerable antenna in such a way as that said antenna at the end of the obstacle is already positioned along an expected pointing direction.

According to an embodiment, the steering step 100 comprises after the pre-pointing sub-step 113 the sub-steps of:
a) resuming 114 a closed loop tracking of the steerable antenna and detecting whether or not a correction of the antenna pointing direction is required;
b) updating 115 said expected pointing direction stored into said geographical database based on said correction.

It must be observed that the above data advantageously allows the mobile terminal 20 to perform in time an auto learning algorithm and to refine in time the stored information about expected pointing directions of the antenna at the exit, or end, of each obstacle. In fact, the information related to the corrections required at the exit or end of a same obstacle can be advantageously collected and used statistically over time in order to continuously refine the pre-pointing information stored into the geographical database 26. For this purpose, according to an embodiment:

the above described sub-step a) 114 is repeatedly performed at the end of said obstacle each time said vehicle crosses said obstacle for obtaining each time a correction value, thus obtaining a plurality of correction values;

the information related to the corrections required at the exit or end of a same obstacle are collected;

the above described sub-step b) 115 comprises an operation of statistically analyzing said information related to the corrections required and the update of the information about the expected pointing is performed on the basis of said statistical analysis.

For example, the information related to the corrections required comprises a plurality of correction values or corrected pointing directions and the operation of statistically analyzing said information related to the corrections required comprises evaluating a mobile average on an integer number of said correction values or corrected pointing directions.

According to an embodiment in the resuming step 114 the closed loop tracking of the steerable antenna is resumed smoothly.

As shown in FIG. 2 the above described embodiments of the steering step 100, may be advantageously performed at the end of an obstacle and before the steps 101-107 aimed to recover for the service control center 20 missing data from the delay buffer 28. The above described embodiments of the steering step 100 advantageously minimize the interruptions of the logical or physical channel D1 thus minimizing the missing data to be requested by the mobile terminal 20 in the step 104 and transmitted by the service control center 10 in the step 107.

It is clear from the above description that the above disclosed method and system are such to provide an efficient and advantageous solution to the technical problem that affects the prior art solutions because they allow to optimize the satellite resources, such as the bandwidth, by determining a buffer refilling strategy for the terminal units of the fleet of vehicles by taking into account geographical information about the obstacles, such as their positions or lengths.

Independently or jointly with the above description of the system and method for providing near real-time IP streaming services to a plurality of mobile terminals 20, it is a further object of the present description to disclose a mobile terminal 20 adapted to be installed on a corresponding vehicle and adapted to cooperate with a service control center 10 for receiving IP data through at least a first satellite logical or physical channel D1, wherein said mobile terminal 20 comprises a steerable satellite antenna, an on board server 20 connected to the steerable satellite antenna and a geographical database 26 connected to the on board server 20, wherein:

the geographical database 26 stores information about obstacles along tracks that can be run by said vehicles and antenna pre-pointing information, the latter being information about corresponding expected pointing directions of the steerable satellite antenna at the end or exit of said obstacles or information useful for computing said expected pointing directions;

the on board server 20 is adapted to detect an interruption of said first satellite logical or physical channel D1 due to one of said obstacles; and said steerable antenna is adapted to be pre-pointed after said detection in such a way as to point along the expected pointing direction associated to said one obstacle in order to try to re-establish as soon as possible at the end of said obstacle said first satellite logical or physical channel D1.

In fact the expedient related to the antenna-pre-pointing along a stored expected pointing direction can be used independently from the presence of a delay buffer and independently of the above described strategy of refilling the delay buffer over the fleet of vehicles. Moreover the above indicated mobile terminal and the antenna pre-pointing expedient can be also used for providing in general to end users IP services not limited to near real-time IP streaming services, but in general to provide IP data.

Naturally, in order to satisfy contingent and specific requirements, a person skilled in the art may apply to the above-described method and system many modifications and variations, all of which, however, are included within the scope of protection of the invention as defined by the following claims.

What is claimed is:

1. A method for providing near real-time IP streaming services to a plurality of mobile terminals, each installed on a corresponding vehicle and each comprising a local delay buffer, the method comprising, for each mobile terminal:
   delivering, by a service control center, a main data stream to the mobile terminal through at least a first satellite logical or physical channel;
   continuously storing a portion of said main data stream into the local delay buffer;
   detecting at the mobile terminal missing data in the portion of the data stream stored in the local delay buffer;
   sending a retransmission request of said missing data to the service control center, through at least second satellite logical or physical channel;
   transmitting to the mobile terminal local delay buffer refilling data comprising said missing data, through at least a third satellite logical or physical channel;
   wherein, in the transmitting step, the transmission of said missing data is managed over time by said service control center based on an information correlated to a distance between the vehicle and a forthcoming obstacle along a track run by said vehicle;
   storing a geographical database comprising information about position of obstacles along tracks that can be run by said vehicle;
   receiving, in the control unit of the mobile terminal, data related to a position and a velocity of the vehicle, and transmitting to service control center information about the position and velocity of the vehicle;
   evaluating, in the service control center, a distance between the vehicle and the position of forthcoming obstacle along the track;
   wherein, in the transmitting step, the transmission of said missing data is managed over time by the service control center based on said evaluated distance.

2. A method according to claim 1, wherein the step of sending a retransmission request includes sending information correlated to the position or velocity of said vehicle.

3. A method according to claim 1, wherein the delivery step is performed according to a multicast protocol.

4. A method according to claim 3, wherein the transmitting step is performed according to a multicast protocol.

5. A method according to claim 3, wherein the transmitting step is performed according to an unicast protocol.

6. A method according to claim 1, wherein:
   the geographical database includes information about lengths of said obstacles; and
   the transmission of said missing data is managed over time by the service control center based also on the length of said forthcoming obstacle.

7. A method according to claim 6, wherein said step of storing the geographical database is performed at said service control center.

8. A method for providing near real-time IP streaming services to a plurality of mobile terminals, each installed on a corresponding vehicle and each comprising a delay buffer, the method comprising, for each mobile terminal:

delivering, by a service control center, a main data stream to the mobile terminal through at least a first satellite logical or physical channel;
continuously storing a portion of said main data stream into the local buffer;
detecting at the mobile terminal missing data in the portion of the data stream stored in the delay buffer;
sending a retransmission request of said missing data to the service control center, through at least second satellite logical or physical channel;
transmitting to the mobile terminal buffer refilling data comprising said missing data, through at least a third satellite logical or physical channel;
wherein, in the transmitting step, the transmission of said missing data is managed over time by said service control center based on information correlated to a distance between the vehicle and a forthcoming obstacle along a track run by said vehicle, the distance being determined by the service control center based upon data received from the vehicle relating to a position and velocity of the vehicle;
wherein the mobile terminal comprises a steerable satellite antenna, an on board server connected to the steerable satellite antenna and a geographical database connected to the on board server, wherein the method further comprises a step of steering the steerable antenna by:
storing into the geographical database information about obstacles along tracks that can be run by said vehicle and antenna pre-pointing information, the latter being information about corresponding expected pointing directions of the steerable satellite antenna at the end or exit of said obstacles or information useful for computing said expected pointing directions;
detecting an interruption of said first satellite logical or physical channel due to one of said obstacles;
pre-pointing said antenna in such a way as to make it point along the expected pointing direction associated to said one obstacle in order to try to re-establish as soon as possible at the end of said obstacle said first satellite logical or physical channel.

9. A method according to claim 8, wherein the steering step comprises after said pre-pointing sub-step the following sub-steps:
a) closed-loop controlling said steerable antenna and detecting whether or not a correction of the antenna pointing direction is required;
b) updating said expected pre-pointing information stored into said geographical database based on said correction.

10. A method according to claim 9, wherein:
said sub-step a) is repeatedly performed at the end of said obstacle each time said vehicle crosses said obstacle for obtaining each time information about the correction required;
the information related to the correction required at the exit or end of a same obstacle is collected;
the above described sub-step b) comprises an operation of statistically analyzing said information related to the corrections required and the update of the information about the expected pointing direction is performed on the basis of said statistical analysis.

11. A method according to claim 10, wherein the information related to the corrections required comprises a plurality of correction values or corrected pointing directions and the operation of statistically analyzing said information related to the corrections required comprises evaluating a mobile average on an integer number of said correction values or corrected pointing directions.

12. A telecommunication system for providing near real-time IP streaming services comprising:
at least one mobile terminal installed on a corresponding vehicle and comprising a delay buffer;
a service control center adapted to deliver a main data stream to the mobile terminal through at least a first satellite logical or physical channel;
wherein:
the at least one mobile terminal is adapted for continuously storing a portion of said main data stream into the local buffer, detecting missing data in the portion of the data stream stored in the delay buffer and sending a retransmission request of said missing data to the service control center, through at least a second satellite logical or physical channel;
the service control center is adapted to transmit to the mobile terminal buffer refilling data comprising said missing data, through at least a third satellite logical or physical channel, wherein the transmission of said missing data is managed over time by the service control center based on information correlated to a distance between the vehicle and a forthcoming obstacle along a track run by said vehicle;
wherein the service control center:
stores a geographical database comprising information about a position of obstacles along tracks that can be run by said vehicle;
evaluates a distance between the vehicle and the position of forthcoming along the track based upon data received from the vehicle relating to a position and velocity of the vehicle;
wherein the transmission of said missing data is managed over time by the service control center based on said evaluated distance.

13. A telecommunication system for providing near real-time IP streaming services comprising:
at least one mobile terminal installed on a corresponding vehicle and comprising a delay buffer;
a service control center adapted to deliver a main data stream to the mobile terminal through at least a first satellite logical or physical channel;
wherein:
the at least one mobile terminal is adapted for continuously storing a portion of said main data stream into the local buffer, detecting missing data in the portion of the data stream stored in the delay buffer and sending a retransmission request of said missing data to the service control center, through at least a second satellite logical or physical channel;
the service control center is adapted to transmit to the mobile terminal buffer refilling data comprising said missing data, through at least a third satellite logical or physical channel, wherein the transmission of said missing data is managed over time by the service control center based on information correlated to a distance between the vehicle and a forthcoming obstacle along a track run by said vehicle, the distance being determined by the service control center based upon data received from the vehicle relating to a position and velocity of the vehicle;
wherein:
the mobile terminal comprises a steerable satellite antenna, an on board server connected to the steerable satellite antenna and a geographical database connected to the on board server, wherein:

the geographical database stores information about obstacles along said tracks and antenna pre-pointing information, the latter being information about corresponding expected pointing directions of the steerable satellite antenna at the end or exit of said obstacles or information useful for computing said expected pointing directions;

the on board server is adapted to detect an interruption of said first satellite logical or physical channel due to one of said obstacles; and said steerable antenna is adapted to be pre-pointed after said detection in such a way as to point along the expected pointing direction associated to said one obstacle in order to try to re-establish as soon as possible at the end or exit of said obstacle said first satellite logical or physical channel.

\* \* \* \* \*

UNITED STATES PATENT AND TRADEMARK OFFICE
CERTIFICATE OF CORRECTION

PATENT NO.       : 9,788,231 B2
APPLICATION NO.  : 14/503624
DATED            : October 10, 2017
INVENTOR(S)      : Alfredo Ferrarotti et al.

Page 1 of 1

It is certified that error appears in the above-identified patent and that said Letters Patent is hereby corrected as shown below:

(73) Assignee: "TeS Teleinformatica e Sistemi S.r.l., Rome (IT)" is changed to
--Space Engineering S.p.A., Rome (IT)--.

Signed and Sealed this
Eleventh Day of September, 2018

Andrei Iancu
*Director of the United States Patent and Trademark Office*